(12) United States Patent
Flanders

(10) Patent No.: US 8,922,782 B2
(45) Date of Patent: Dec. 30, 2014

(54) OCT MEDICAL IMAGING SYSTEM USING GAIN WAVEGUIDE ARRAY SWEPT SOURCE

(71) Applicant: Axsun Technologies, Inc., Billerica, MA (US)

(72) Inventor: Dale C. Flanders, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 126 days.

(21) Appl. No.: 13/837,425

(22) Filed: Mar. 15, 2013

(65) Prior Publication Data

US 2014/0268166 A1    Sep. 18, 2014

(51) Int. Cl.
*G01B 9/02* (2006.01)

(52) U.S. Cl.
CPC .................................. *G01B 9/02* (2013.01)
USPC .............................................. 356/479

(58) Field of Classification Search
USPC ..................................... 356/479, 497; 372/64
See application file for complete search history.

(56) References Cited

U.S. PATENT DOCUMENTS

| | | | |
|---|---|---|---|
| 6,683,711 B2 * | 1/2004 | Zhang et al. | 359/332 |
| 7,061,618 B2 | 6/2006 | Atia et al. | |
| 7,248,614 B2 * | 7/2007 | Yamazaki et al. | 372/64 |
| 7,415,049 B2 | 8/2008 | Flanders et al. | |
| 7,969,578 B2 * | 6/2011 | Yun et al. | 356/497 |
| 8,059,277 B2 | 11/2011 | Atia et al. | |
| 8,687,666 B2 * | 4/2014 | Goldberg et al. | 372/99 |
| 2008/0037608 A1 * | 2/2008 | Zhou et al. | 372/50.11 |
| 2011/0051143 A1 | 3/2011 | Flanders et al. | |
| 2011/0051148 A1 | 3/2011 | Flanders et al. | |
| 2011/0216417 A1 | 9/2011 | Chann et al. | |
| 2011/0216792 A1 | 9/2011 | Chann et al. | |
| 2011/0305250 A1 | 12/2011 | Chann et al. | |
| 2011/0305256 A1 | 12/2011 | Chann et al. | |
| 2011/0310921 A1 | 12/2011 | Chann et al. | |
| 2012/0105968 A1 | 5/2012 | Chann et al. | |

OTHER PUBLICATIONS

Yun, S., et al., "High-speed spectral-domain optical coherence tomography at 1.3 µm wavelength," Optics Express, vol. 11, No. 26, Dec. 29, 2003, pp. 3598-3604.

* cited by examiner

*Primary Examiner* — Michael A Lyons
(74) *Attorney, Agent, or Firm* — Houston & Associates, LLP

(57) ABSTRACT

An optical coherence tomography system uses an optical source that comprises a series of gain waveguides that generate light at the frequencies at which the interference signal is to be sampled. In this way, the optical source generates a discretely tuned optical signal. This has the advantage that the tuning can be directly controlled by a controller that is also used to synchronize the sampling of the interference signal. This avoids the need for separate frequency clock synchronization. In embodiments, the gain waveguides are fabricated from one or more semiconductor edge emitting bars. In some implementations, the gain waveguides comprise periodic structures that define the frequency of operation of the waveguide. However in other implementations, the combiner comprises a dispersive element, such as a diffractive grating, that provides frequency specific feedback to each waveguide.

19 Claims, 6 Drawing Sheets

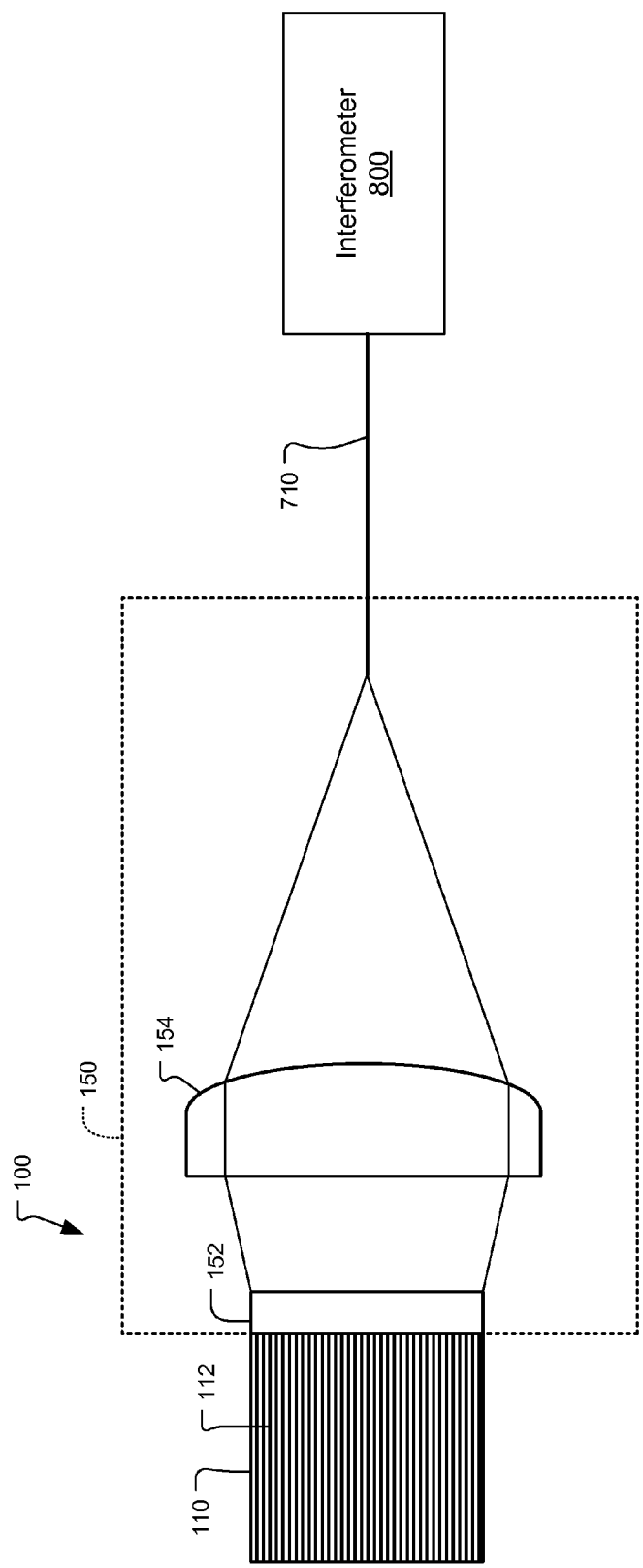

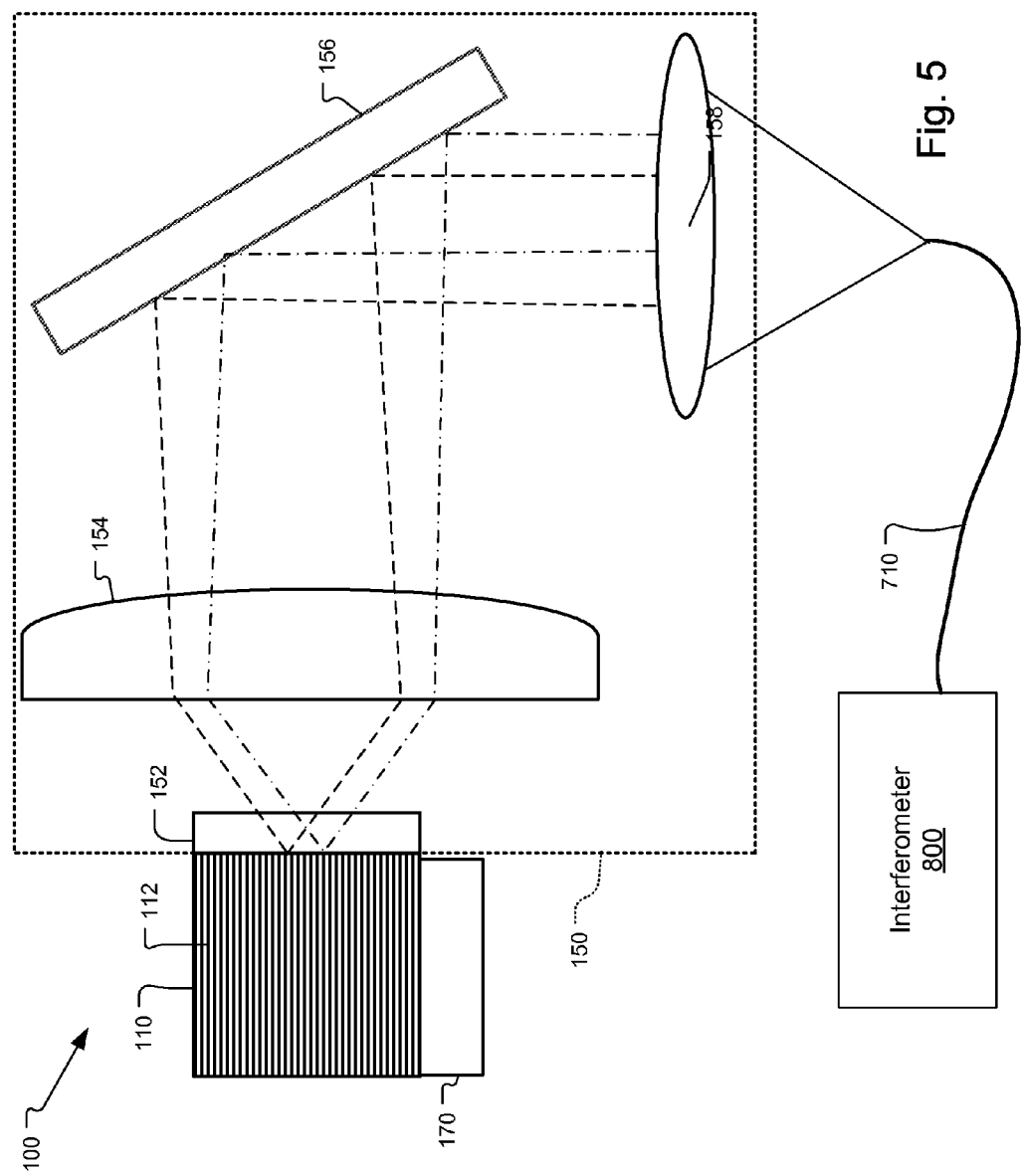

OCT MEDICAL IMAGING SYSTEM USING GAIN WAVEGUIDE ARRAY SWEPT SOURCE

BACKGROUND OF THE INVENTION

Optical coherence analysis relies on the use of the interference phenomena between a reference wave and an experimental wave or between two parts of an experimental wave to measure distances and thicknesses, and calculate indices of refraction of a sample. Optical Coherence Tomography (OCT) is one example technology that is used to perform high-resolution cross sectional imaging. It is often applied to imaging biological tissue structures, for example, on microscopic scales in real time. Optical waves are reflected from an object or sample and a computer produces images of cross sections of the object by using information on how the waves are changed upon reflection.

Fourier domain OCT (FD-OCT) currently offers the best performance for many applications. Moreover, of the Fourier domain approaches, swept-source OCT has distinct advantages over techniques such as spectrum-encoded OCT because it has the capability of balanced and polarization diversity detection. It has advantages as well for imaging in wavelength regions where inexpensive and fast detector arrays, which are typically required for spectrum-encoded FD-OCT, are not available.

In swept source OCT, the spectral components are not encoded by spatial separation, but they are encoded in time. The spectrum is either filtered or generated in successive frequency steps and reconstructed before Fourier-transformation. Using the frequency scanning swept source, the optical configuration becomes less complex but the critical performance characteristics now reside in the source and especially its frequency tuning speed and accuracy.

High speed frequency tuning for OCT swept sources is especially relevant to in vivo imaging where fast imaging reduces motion-induced artifacts and reduces the length of the patient procedure. It can also be used to improve resolution.

The swept sources for OCT systems have typically been tunable lasers. The advantages of tunable lasers include high spectral brightness and relatively simple optical designs. A tunable laser is constructed from a gain medium, such as a semiconductor optical amplifier (SOA) that is located within a resonant cavity, and a tunable element such as a rotating grating, grating with a rotating mirror, or a Fabry-Perot tunable filter. Currently, some of the highest tuning speed lasers are based on the laser designs described in U.S. Pat. No. 7,415,049 B1, entitled Laser with Tilted Multi Spatial Mode Resonator Tuning Element, by D. Flanders, M. Kuznetsov and W. Atia. The use of micro-electro-mechanical system (MEMS) Fabry-Perot tunable filters combines the capability for wide spectral scan bands with the low mass, high mechanical resonant frequency deflectable MEMS membranes that have the capacity for high speed tuning.

Certain tradeoffs in laser design, however, can be problematic for OCT systems. Generally, shorter laser cavities translate to higher potential tuning speeds, since laser oscillation must build up anew from spontaneous emission when the laser is tuned. Thus, round-trip travel time for the light in the laser cavities should be kept low so that this build up occurs quickly. Short laser cavities, however, create problems in terms of the spectral spacing of the longitudinal cavity modes of the laser. That is, lasers can only produce light at frequencies that are integer multiples of the cavity mode spacing since the light must oscillate within the cavities. Shorter cavities result in fewer and more widely spectrally spaced modes. This results in greater mode hopping noise as the laser is tuned over these discrete cavity modes. So, when designing an OCT laser, there is typically a need to choose between low noise and high speed.

Another class of swept sources that has the potential to avoid inherent drawbacks of tunable lasers is filtered amplified spontaneous emission (ASE) sources that combine a broadband light source, typically a source that generates light by ASE, with tunable filters and amplifiers.

Some of the highest speed devices based on filtered ASE sources are described in U.S. Pat. No. 7,061,618 B2, entitled Integrated Spectroscopy System, by W. Atia, D. Flanders P. Kotidis, and M. Kuznetsov, which describes spectroscopy engines for diffuse reflectance spectroscopy and other spectroscopic applications. A number of variants of the filtered ASE swept source are described, including amplified versions and versions with tracking filters.

More recently U.S. patent application Ser. No. 12/553,295, filed on Sep. 3, 2009, entitled Filtered ASE Swept Source for OCT Medical Imaging, by D. Flanders, W. Atia, and M. Kuznetsov (U.S. Pat. Pub. No. US 2011/0051148 A1), which is incorporated herein in its entirety by this reference, lays out various integrated, high speed filtered ASE swept source configurations. U.S. patent application Ser. No. 12/776,373, filed on May 8, 2010, entitled ASE Swept Source with Self-Tracking Filter for OCT Medical Imaging, by the same inventors (U.S. Pat. Pub. No. US 2011/0051143 A1), outlines still further configurations that rely on the use of a self-tracking filter arrangement that can improve performance both in terms of sweep rate and linewidth, among other things, and which is also incorporated herein in its entirety by this reference.

In order to compensate for instabilities and/or non-linearities in the tuning of the OCT swept sources, a sampling clock (k-clock) is often employed to enable sampling at equally spaced increments in the optical frequency domain (k-space). This k-clock must usually be delayed to match the delay associated with the optical signals in the sample and reference arms of the interferometer of the OCT system.

If a k-clock is not used but the swept source tunes non-linearly, other corrective options are employed. Some resample the data equally in k-space by interpolation, see S. Yun, G. Tearney, B. Bouma, B. Park, and J. de Boer, "High-speed spectral-domain optical coherence tomography at 1.3 µm wavelength," Opt. Express 11, 3598-3604 (2003).

Resampling in k-space, however, has disadvantages. This is because another metric that characterizes the performance of OCT systems is the electronic bandwidth of the electronic signal processing systems. Sufficiently high bandwidth is becoming increasingly important as higher speed, performance and resolution OCT systems are produced. For example, increasing the wavelength tuning speed of the swept source, which produces higher OCT image acquisition speeds, also results in greater requirements for the electronics that are used to sample the resulting optical interference signals. Typically, to accurately resample, oversampling must be employed, which adds overhead to the electronic signal processing systems.

Implicit in the use of the K-clock is the notion that in swept-source OCT the swept source need not scanned continuously through the scan band. That is, sampling is only performed at the frequency increments in the optical frequency domain.

U.S. Pat. No. 8,059,277 is directed to a mode hopping swept frequency laser for Fourier domain optical coherence tomography and method of operation. This laser only generates the optical signal at the discrete frequencies associated with the longitudinal modes of the swept source laser by utilizing a relatively short cavity tunable laser.

SUMMARY OF THE INVENTION

The present invention concerns an optical coherence tomography system with an optical source that comprises a series of gain waveguides that generate light at the frequencies at which the interference signal is to be sampled. In this way, in the preferred embodiment the optical source generates a discretely tuned optical signal. This has the advantage that the tuning can be directly controlled by a controller that is also used to synchronize the sampling of the interference signal. This avoids the need for separate frequency clock synchronization.

One drawback is, however, that separate gain waveguides are now required for each of the separate sampling frequencies. This could be problematic when relatively large data sets are required for the optical coherence analysis. However, for many applications, such a large sampling set is not required. On the other hand, the present system has capacity for much higher speed tuning and a much simpler yet more robust optical and electronic design.

In general, according to one aspect, the invention features an optical coherence analysis system comprising a swept optical source including an array of gain waveguides that amplify light at different frequencies and a combiner that combines light from the gain waveguides into an optical signal. An interferometer divides the optical signal between a reference arm and a sample arm leading to a sample and a detection system detects an interference signal generated from the optical signal from the reference arm and from the sample arm.

In embodiments, the gain waveguides are fabricated from one or more semiconductor edge emitting bars. In other examples, rare earth doped slab waveguide systems are used.

In some implementations, the gain waveguides comprise periodic structures that define the frequency of operation of the waveguide. However in other implementations, the combiner comprises a dispersive element, such as a diffractive grating, that provides frequency specific feedback to each of the gain waveguides.

In one example, the combiner comprises at least one cylindrical lens. A switching system and a current source are further used, wherein the switching system provides current from the current source sequentially to the gain waveguides. Specifically, the switching system provides current from the injection current source sequentially to the gain waveguides as a ridge injection current. A controller synchronizes the switching system and the sampling by the data acquisition system.

In general, according to another aspect, the invention features an optical coherence analysis method comprising amplifying light at different frequencies using an array of gain waveguides, combining the light from the gain waveguides into an optical signal, dividing the optical signal between a reference arm of an interferometer and a sample arm of the interferometer, the sample arm leading to a sample, and detecting an interference signal generated from the optical signal from the reference arm and from the sample arm.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same or similar parts throughout the different views. The drawings are not necessarily to scale: emphasis has instead been placed upon illustrating the principles of the invention. Of the drawings:

FIG. 3 is a schematic plan view of one embodiment of the array 110 and the combiner 150;

FIG. 5 is a schematic plan view of another embodiment of the array 110 and the combiner 150 that uses a dispersive element 156.

DETAILED DESCRIPTION OF THE PREFERRED EMBODIMENTS

Figure 1:
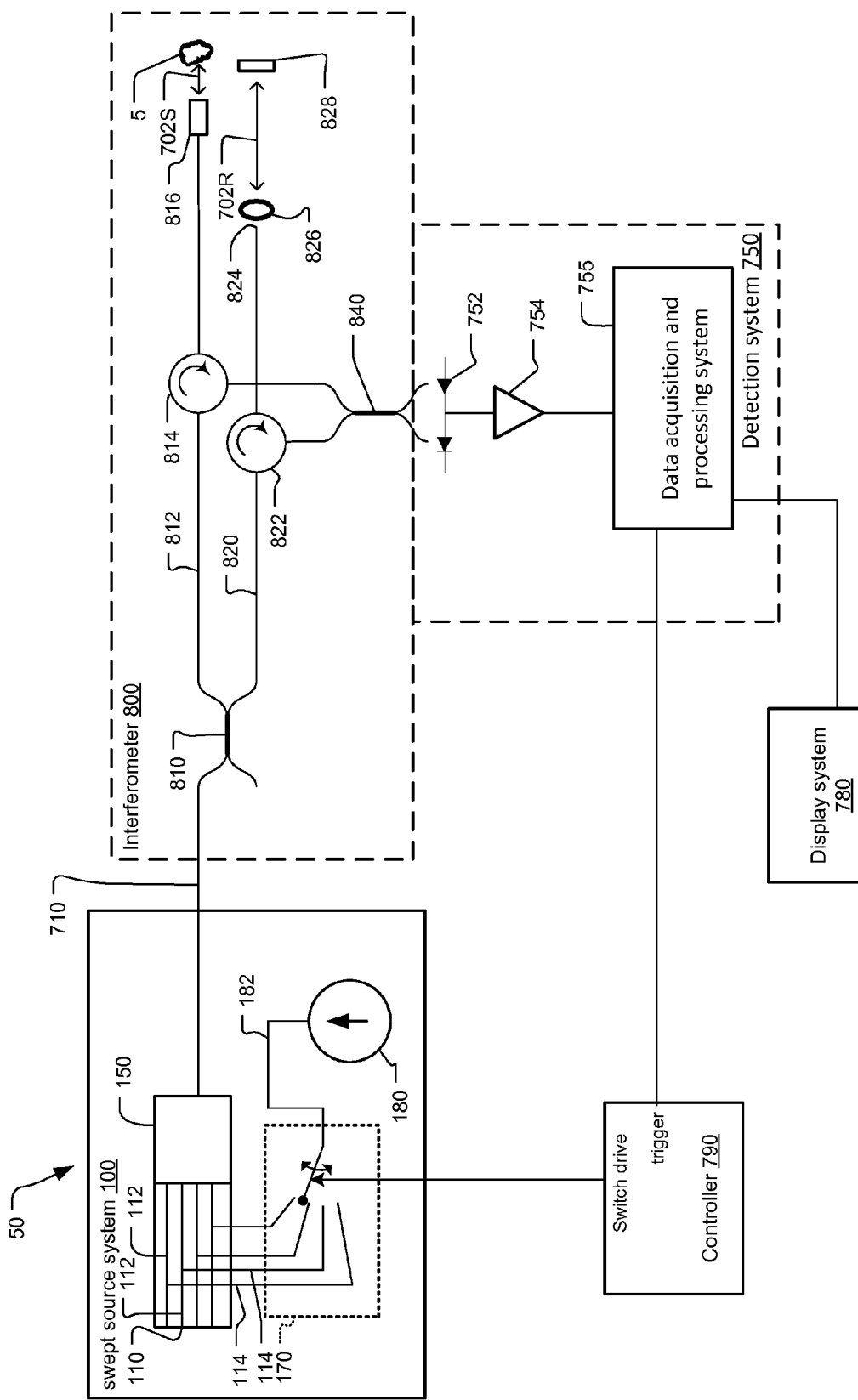
FIG. 1 is a schematic view of an OCT system incorporating the gain waveguide array swept source according to an embodiment of the invention.

FIG. 1 shows an optical coherence analysis system 50, such as a tomography system, incorporating an optical source 100 including an array of gain waveguides, which has been constructed according to the principles of the present invention.

The optical source 100 generates the tunable or swept optical signal that is transmitted to interferometer 800. The swept optical signal discretely scans over a scan band with a narrowband emission.

In more detail, the swept optical source 100 includes an array 110 of gain waveguides 112 that amplify light at different frequencies. The light generated by these waveguides is then provided to a combiner 150 that combines light from the gain waveguides 112 into the optical signal, which is provided, for example, on an optical fiber 710.

A switching system 170 and a current source 180 are used to provide current from the current source sequentially to the gain waveguides 112. The approach is used when the gain waveguides are electrically pumped, such as diodes. Specifically, a controller generates a switch drive signal to the switching system 170 so that the current source is sequentially connected to provide a drive current to the different gain waveguides 112.

The array 110 is preferably fabricated from one or more semiconductor edge emitting bars. In one example, the gain waveguides each comprise periodic structures that define the frequency of operation of the waveguides. In other examples, the combiner 150 comprises a dispersive element that provides frequency specific feedback to each of the gain waveguides.

The material system of the array 110 is selected based on the desired spectral operating range. Common material systems are based on III-V semiconductor materials, including binary materials, such as GaN, GaAs, InP, GaSb, InAs, as well as ternary, quaternary, and pentenary alloys, such as InGaN. InAlGaN, InGaP, AlGaAs, InGaAs, GaInNAs, GaInNAsSb, AlInGaAs, InGaAsP, AlGaAsSb, AlGaInAsSb, AlAsSb, InGaSb, InAsSb, and InGaAsSb. Collectively, these material systems support operating wavelengths from about 400 nanometers (nm) to 2000 nm, including longer wavelength ranges extending into multiple micrometer wavelengths. Semiconductor quantum well and quantum dot gain regions are typically used to obtain especially wide gain and spectral emission bandwidths. Currently, edge-emitting chips are used although vertical cavity surface emitting laser (VCSEL) chips are used in different implementations.

In the illustrated example, a Mach-Zehnder-type interferometer 800 is used to analyze the optical signals from the sample 5. The discretely swept optical signal from the optical source 100 is transmitted on fiber 710 to a 90/10 optical fiber coupler 810 or other beam splitter, to give specific examples. The swept optical signal is divided between a reference arm 820 and a sample arm 812 of the interferometer 800.

The optical fiber of the reference arm 820 terminates at the fiber endface 824. The light 702R exiting from the reference arm fiber endface 824 is collimated by a lens 826 and then reflected by a reference mirror 828 to return back, in some exemplary implementations.

The reference mirror 828 has an adjustable fiber to mirror distance, in one example. This distance determines the depth range being imaged, i.e. the position in the sample 5 of the zero path length difference between the reference arm 820 and the sample arm 812. The distance is adjusted for different sampling probes and/or imaged samples. Light returning from the reference mirror 828 is returned to a reference arm circulator 822 and directed to an interference signal combiner 840, such as a 50/50 fiber coupler. In other examples, such as those using free space optical configurations, the combiner 840 is a partially reflecting mirror/beam splitter.

The fiber on the sample arm 812 terminates at the sample arm probe 816. The exiting swept optical signal 702S is focused by the probe 816 onto the sample 5. Light returning from the sample 5 is returned to a sample arm circulator 814 and directed to the interference signal combiner 840.

The reference arm signal and the sample arm signal are combined or mixed in the interference signal combiner 840 to generate an interference signal.

The interference signal is detected in a detection system 750. Specifically, a balanced receiver, comprising two detectors 752, is located at each of the outputs of the fiber coupler 840 in the illustrated embodiment. The electronic interference signal from the balanced receiver 752 is amplified by amplifier 754, such as a transimpedance amplifier.

A data acquisition and processing system 755 of the detection system 750 is used to sample the interference signal output from the amplifier 754 and analog to digitally convert the interference signal. A trigger signal generated by the controller 790 is synchronized to the frequency tuning of the optical signal and controls the sampling by the data acquisition and processing system 755.

The data acquisition and processing system 755 samples the interference signals to generate evenly spaced samples of the interference signal in the optical frequency domain. In one example, both the switch drive signal and the trigger signal are both generated by the controller 790 and are synchronized such that with each change in the state of the switching system 170 and the energization of another of the gain waveguides 112, the data acquisition and processing system 755 is signaled to again sample the interference signal. In one example, there is a slight delay between the switch drive signal and the trigger signal to account for the delays associated with the optical signal propagation from the swept source system 100 through the interferometer 800 to the detection by the balanced receiver 752.

A complete data set is collected of the sample 5 by spatially raster scanning the focused probe beam point from the probe 816 over the sample 5 in a Cartesian geometry x-y fashion or a cylindrical geometry theta-z fashion. The spectral response at each one of these points is generated from the frequency tuning of the swept source 100.

The data acquisition and processing system 755 performs a Fourier transform on the data in order to reconstruct the image and perform a 2D or 3D tomographic reconstruction of the sample 5. This transformed data are displayed by the display system 780.

The optical source 100 is generally intended for high speed tuning to generate an optical signal that repeatedly scan over the scan band(s) at rates of greater than 1 kiloHertz (kHz). In current embodiments, the optical source 100 tunes at speeds greater than 20 or 100 kHz. In very high speed embodiments, the optical source 100 tunes at speeds greater than 200 or 500 kHz.

Typically, the width of the tuning or scan band is greater than 10 nanometers (nm). In the current embodiments, it is preferably between 50 and 150 nm, although even wider tuning bands are contemplated in some examples. On the other hand, the bandwidth of the narrowband emission has a full width half maximum (FWHM) bandwidth of less than 20 or 10 GigaHertz (GHz), and is usually 5 GHz or less. For optical coherence tomography, this high spectral resolution implies a long coherence length and therefore enables imaging deeper into samples, for example deeper than 5 millimeters (mm). On the other hand, in lower performance applications, for example OCT imaging less than 1 mm deep into samples, broader FWHM passbands are sometimes appropriate, such as passbands of about 200 GHz or less.

One advantage of the present system is that a clock system that is traditionally used to generate k-clock signals at equally spaced optical frequency sampling intervals as the swept optical signal is tuned or swept over the scan or tuning band is not required in the current system. This is because the controller 790 preferably directly synchronizes the generation of the optical signal at the different frequencies by selectively activating the gain waveguides 112 of the optical source 100 and then directly synchronizes the sampling by the data acquisition and processing system 755 via the trigger signal.

Figure 2:
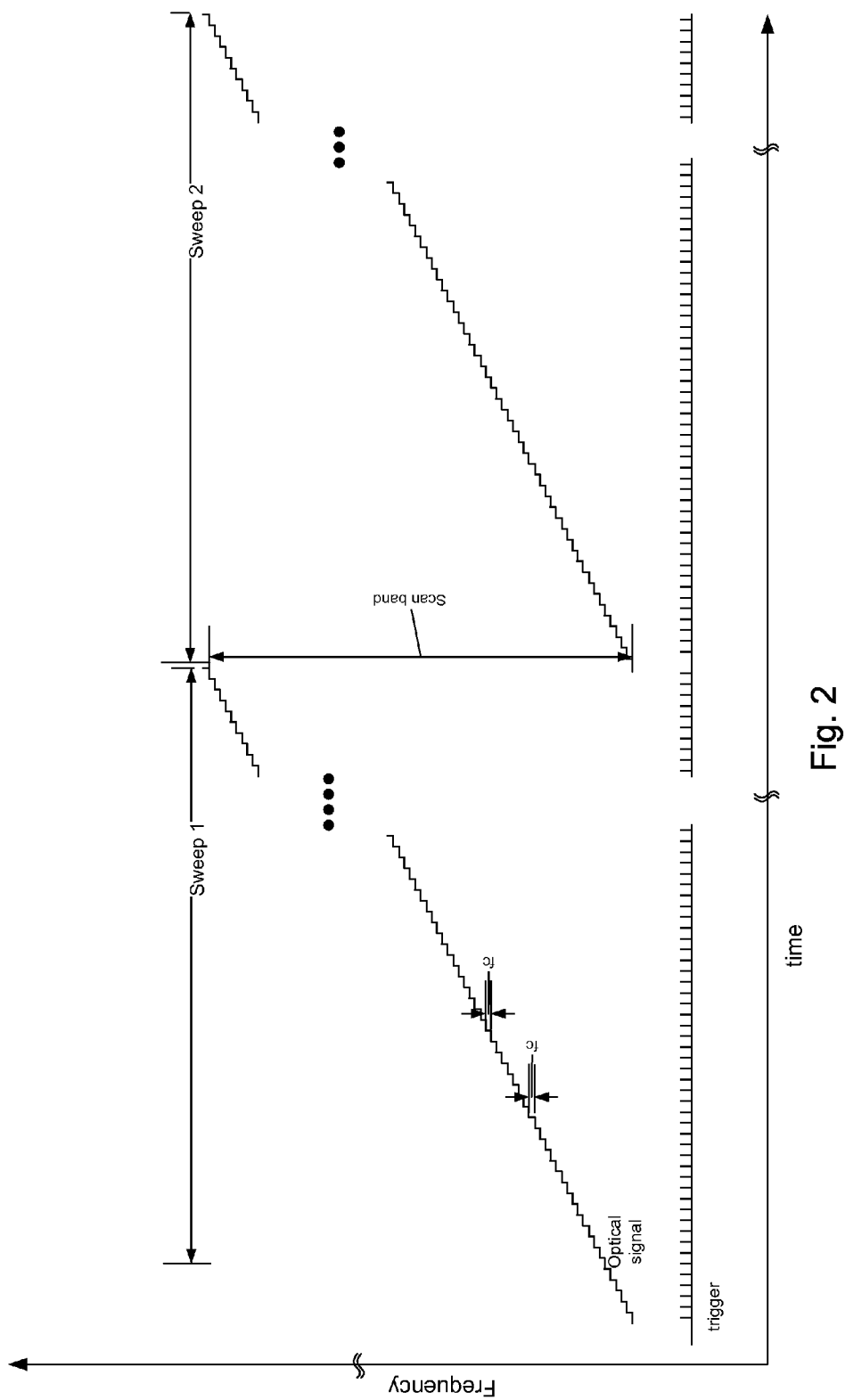
FIG. 2 includes plots of the frequency of the optical signal for several sweeps as a function of time and also show the timing of the trigger signal generated by the controller 790.

FIG. 2 plots the frequency of the optical signal for several sweeps as a function of time. It also shows the timing of the trigger signal generated by the controller 790.

In more detail, as the current from the current source 180 is sequentially provided to the gain waveguides 112 of the array 110, light is generated and amplified at different frequencies. This is combined into the optical signal that is provided on optical fiber 710 to the interferometer 800.

As result, in the preferred embodiment, the frequency of the optical signal changes in a stepwise fashion to discretely sweep across the scan band, for each of the successive sweeps: sweep 1, sweep 2. The frequency increment between each step is preferably a constant $f_c$ of the entire sweeps.

At the same time, with each step of the optical signal, the trigger signal goes active to signal that the data acquisition should analog to digitally convert the interference signal.

FIG. 3 shows one embodiment of the array 110 and the combiner 150.

The waveguide array 110 is preferably a semiconductor diode waveguide array comprised of at least 100 separate waveguides 112. In a preferred embodiment, the array 110 has preferably 1000 or more waveguides 112. In still other embodiments, it has 10,000 or more waveguides 112. The light that is generated by each of these waveguides is focused vertically, i.e., the plane that is orthogonal to the plane of the figure and the axis of the waveguides by a first cylindrical lens 152. It is then focused laterally, i.e., in the plane of the figure and the axis of the waveguides, by a second cylindrical lens 154. It is then coupled into an entrance facet of the optical fiber 710.

Figure 4B:
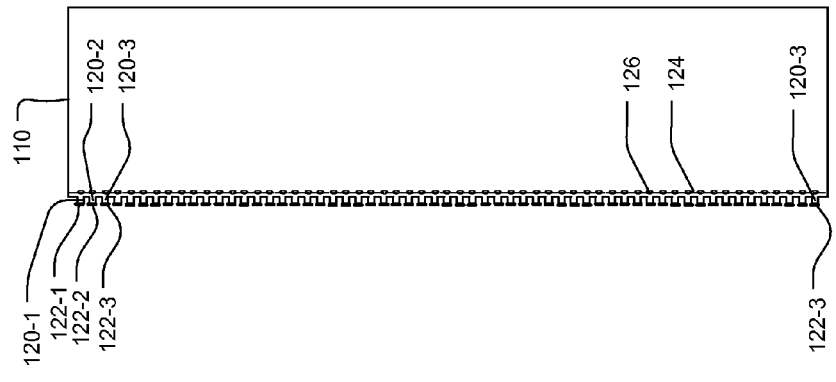
FIGS. 4A and 4B illustrate one implementation of the waveguide array 110, with FIG. 4A showing a top view and FIG. 4B showing the front face of the array 110.
Figure 4A:
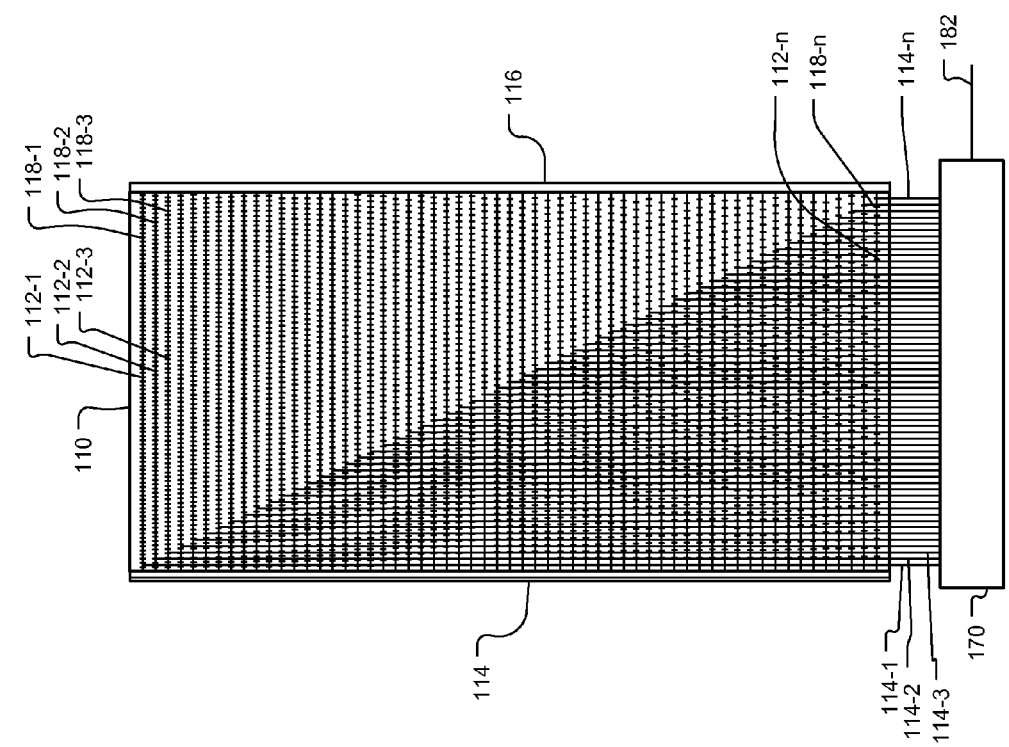

FIGS. 4A and 4B illustrate one implementation of the waveguide array 110. Specifically, the waveguide array comprises separate waveguides 112-1 to 112-$n$ that extend along the lateral length of the array 110. A rear face of the array 110 is coated with an optically reflective layer 114. A front face of the array 110 is coated to have a low reflectivity, such as less than 10%, with an antireflection coating 116.

In order to constrain the operation of the separate waveguides 112-1 to 112-$n$ to operate at specified discrete optical frequencies, periodic structures 118-1 to 118-$n$ are formed in connection with each of the waveguides 112. These periodic structures, such as gratings, each have a different spatial periodicity that defines the optical frequency of operation of the corresponding waveguide.

Depending on the implementation, different periodic structures 118 are used. In one example, the periodic structures 118 are wavelength chirped volume Bragg gratings. In another example, structures used as are found in distributed feedback (DFB) laser elements. In still a different example, the periodic structures are distributed Bragg reflector (DBR) laser elements.

The current is supplied to each of the gain waveguides 112-1 to 112-$n$ via separate row address lines 114-1 to 114-$n$. These carry the ridge injection current from the switching system 170 to the separate gain waveguides 112 to enable their separate activation.

FIG. 4B illustrates the front face of the waveguide array. It shows the ridges 120 associated with the separate gain waveguides 112. Along the top of the each of the ridges 120 is a corresponding conductive layer 122 that allows the distribution of the ridge injection current over the length of the gain waveguides 112.

The ridge injection current causes the generation of light in the active layer 124 that extends over the entire length of the array 110. This causes light to be admitted via the facets 126 associated with each of the ridges 120.

FIG. 5 illustrates another embodiment of the optical source 100. In this example, the array 110 generates light from the separate waveguides that are focused and collimated by a series of cylindrical lenses 152, 154 of the combiner 150.

The light from the separate waveguides 112, however, is directed to a dispersive element 156 in the combiner 150. Typically, this dispersive element 156 is a diffractive grating. In other examples, it is a holographic grating.

The dispersive element 156 provides frequency selective optical feedback to each of the separate waveguides 112. The light from each of the waveguides strikes the grating at a slightly different angle so that the feedback provided by the grating varies across the width of the array 110. Preferably, the spacing between the waveguides 112 and the pattern of the grating 156 are selected such that the optical frequency difference in the feedback from waveguide to waveguide is constant.

Specifically, if the frequency of the feedback is f, to a given waveguide 112-$n$, then $f_n - f_{n-1} = f_c$, i.e., a constant for every adjoining pair of waveguides across the array 110.

As result, as the separate waveguides are successively activated by the switching system 150, the optical signal that is collected by the lens 158 and provided on the optical fiber 710 scans through the scan band in a stepwise fashion, with a constant frequency step $f_c$, illustrated in FIG. 2.

Figure 6:
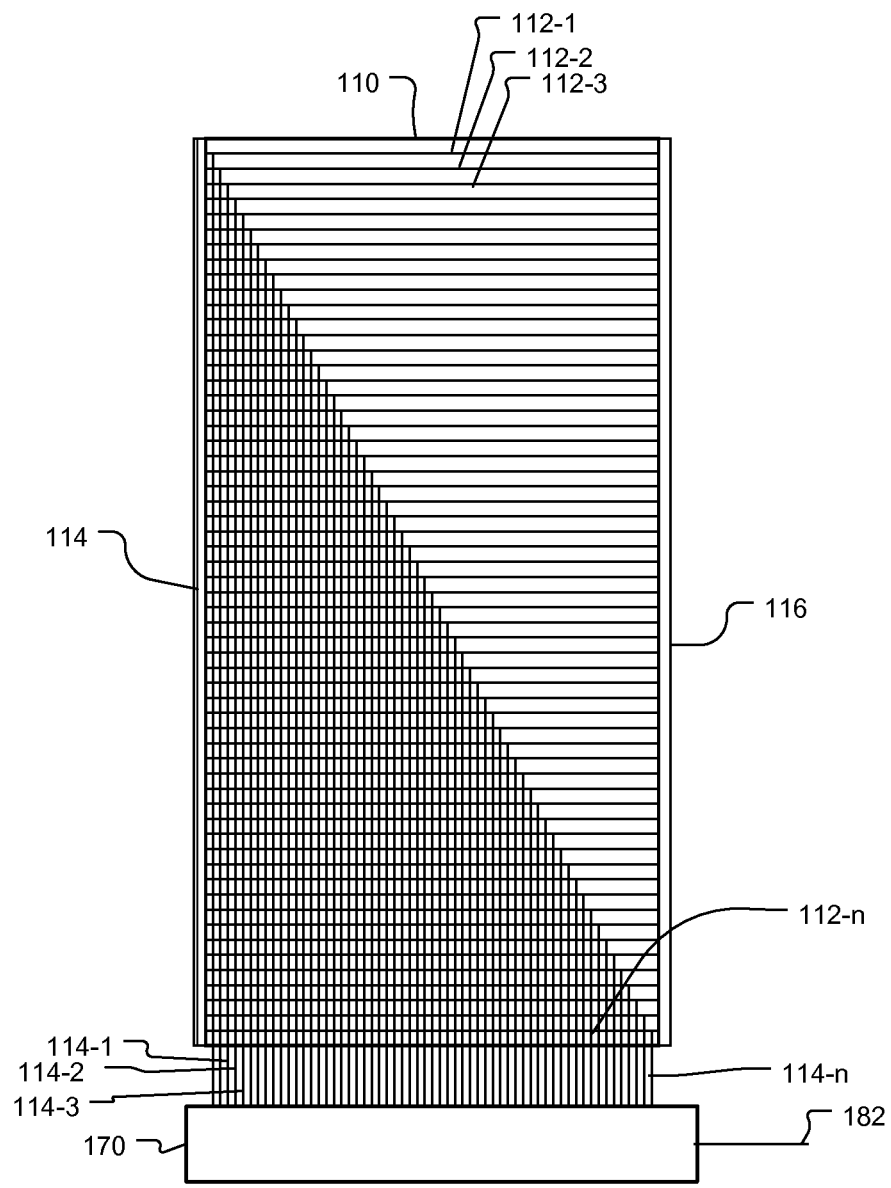
FIG. 6 illustrates a top view of the waveguide array 110 used in the embodiment of FIG. 5.

FIG. 6 illustrates the array 110 of the diode bar that is used with the embodiment illustrated in FIG. 5. In this example, periodic structures are preferably not provided for the waveguides 112. Instead, the waveguides 112 essentially function as separate semiconductor optical amplifiers.

As result, in this configuration, the front facet 116 is preferably antireflection coated. The rear facet 114 is coated to be highly reflecting.

In a variant, the diode bar is replaced with a rare-earth doped slab that comprises separate waveguides. In this case, an optical pumping arrangement would typically be used.

While this invention has been particularly shown and described with references to preferred embodiments thereof, it will be understood by those skilled in the art that various changes in form and details may be made therein without departing from the scope of the invention encompassed by the appended claims. For example, although the invention has been described in connection with an OCT system, the invention could also be applied to spectroscopic analysis.

What is claimed is:

1. An optical coherence analysis system comprising:
    a swept optical source including an array of gain waveguides that amplify light at different frequencies and a combiner that combines light from the gain waveguides into an optical signal;
    an interferometer for dividing the optical signal between a reference arm and a sample arm leading to a sample; and
    a detection system for detecting an interference signal generated from the optical signal from the reference arm and from the sample arm.

2. A system as claimed in claim 1, wherein the gain waveguides are fabricated from one or more semiconductor edge emitting bars.

3. A system as claimed in claim 1, wherein the gain waveguides comprise periodic structures that define the frequency of operation of the waveguide.

4. A system as claimed in claim 1, wherein the combiner comprises a dispersive element that provides frequency specific feedback to each of the gain waveguides.

5. A system as claimed in claim 4, wherein the dispersive element is a diffractive grating.

6. A system as claimed in claim 1, wherein the combiner comprises at least one cylindrical lens.

7. A system as claimed in claim 1, further comprising a switching system and a current source, wherein the switching system provides current from the current source sequentially to the gain waveguides.

8. A system as claimed in claim 7, wherein the detection system comprises a data acquisition system that samples interference signal.

9. A system as claimed in claim 8, further comprising a controller for synchronizing the switching system and the sampling by the data acquisition system.

10. A system as claimed in claim 1, further comprising a switching system and an injection current source, wherein the switching system provides current from the injection current source sequentially to the gain waveguides as a ridge injection current.

11. An optical coherence analysis method comprising:
    amplifying light at different frequencies using an array of gain waveguides;
    combining the light from the gain waveguides into an optical signal;
    dividing the optical signal between a reference arm of an interferometer and a sample arm of the interferometer, the sample arm leading to a sample; and detecting an interference signal generated from the optical signal from the reference arm and from the sample arm.

12. A method as claimed in claim 11, wherein the gain waveguides are fabricated from one or more semiconductor edge emitting bars.

13. A method as claimed in claim 11, wherein the gain waveguides comprise periodic structures that define the frequency of operation of the waveguide.

14. A method as claimed in claim 11, further comprising feedback back light into the gain waveguides with a dispersive element that provides frequency specific feedback.

15. A method as claimed in claim 14, wherein the dispersive element is a diffractive grating.

16. A method as claimed in claim 11, further comprising applying current from a current source sequentially to the gain waveguides.

17. A method as claimed in claim 11, further comprising applying current from an injection current source sequentially to the gain waveguides as a ridge injection current.

18. A method as claimed in claim 11, further comprising synchronizing the provision of the current to the different gain waveguides with sampling of the interference signal.

19. An optical coherence analysis system comprising:
a swept optical source including an array of gain waveguides that amplify light at different frequencies and a combiner that combines light from the gain waveguides into an optical signal;
an interferometer for dividing the optical signal between a reference arm and a sample arm leading to a sample;
a detection system for detecting an interference signal generated from the optical signal from the reference arm and from the sample arm;
a switching system and a current source, wherein the switching system provides current from the current source sequentially to the gain waveguides; and
a controller for synchronizing the switching system and the sampling by the data acquisition system.

* * * * *